United States Patent
Zhang et al.

(10) Patent No.: US 11,089,629 B2
(45) Date of Patent: Aug. 10, 2021

(54) RANDOM ACCESS METHOD, DEVICE, AND EQUIPMENT

(71) Applicant: ZTE CORPORATION, Shenzhen (CN)

(72) Inventors: Junfeng Zhang, Shenzhen (CN); Peng Hao, Shenzhen (CN); Wei Gou, Shenzhen (CN); Patrick Svedman, Shenzhen (CN); Aimin You, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/333,472

(22) PCT Filed: Jul. 27, 2017

(86) PCT No.: PCT/CN2017/094707
§ 371 (c)(1),
(2) Date: Jun. 25, 2019

(87) PCT Pub. No.: WO2018/054163
PCT Pub. Date: Mar. 29, 2018

(65) Prior Publication Data
US 2019/0350000 A1    Nov. 14, 2019

(30) Foreign Application Priority Data
Sep. 23, 2016  (CN) .......... 201610848341.3

(51) Int. Cl.
*H04W 4/00* (2018.01)
*H04W 74/08* (2009.01)
*H04W 72/04* (2009.01)

(52) U.S. Cl.
CPC ... *H04W 74/0833* (2013.01); *H04W 72/0406* (2013.01); *H04W 72/0466* (2013.01)

(58) Field of Classification Search
None
See application file for complete search history.

(56) References Cited

U.S. PATENT DOCUMENTS 6,259,724 B1    7/2001  Esmailzadeh
10,306,596 B2 *  5/2019  Baghel .................. H04L 63/123
(Continued)

FOREIGN PATENT DOCUMENTS

CN    1234169 A    11/1999
CN    101489305 A    7/2009
(Continued)

OTHER PUBLICATIONS

Xinwei, "Considerations on Initial Access Design," 3GPP TSG RAN WG1 Meeting #86, Gothenburg, Sweden, Aug. 22-26, 2016, R1-166586, 6 pages.
(Continued)

*Primary Examiner* — Phuongchau Ba Nguyen
(74) *Attorney, Agent, or Firm* — Perkins Coie LLP

(57) ABSTRACT

A random access method, device, and equipment are disclosed. The method includes: receiving, by a network node, a random access request, wherein the random access request comprises a preamble and a first data block; and sending, by the network node, a random access response.

16 Claims, 4 Drawing Sheets

Receive, by a network node, a random access request, wherein the random access request Includes at least a preamble and a first data block    101

Send, by the network node, a random access response (RAR) to a terminal    102

(56) References Cited

U.S. PATENT DOCUMENTS

| | | | | |
|---|---|---|---|---|
| 2009/0316630 | A1* | 12/2009 | Yamada | H04W 56/005 370/328 |
| 2011/0310857 | A1* | 12/2011 | Vujcic | H04W 74/0833 370/336 |
| 2013/0201960 | A1* | 8/2013 | Kim | H04W 74/0833 370/331 |
| 2015/0049712 | A1 | 2/2015 | Chen et al. | |
| 2015/0319638 | A1* | 11/2015 | Rune | H04L 1/0072 370/229 |
| 2018/0184460 | A1* | 6/2018 | Hou | H04W 74/0833 |
| 2020/0187266 | A1* | 6/2020 | Lou | H04W 76/11 |
| 2021/0014893 | A1* | 1/2021 | Park | H04L 5/0092 |

FOREIGN PATENT DOCUMENTS

| | | |
|---|---|---|
| CN | 103297207 A | 9/2013 |
| CN | 105142236 A | 12/2015 |

OTHER PUBLICATIONS

Ericsson, "On the random access procedure," 3GPP TSG-RAN WG1 #86, Gothenburg, Sweden, Aug. 22-26, 2016, R1-167059, 4 pages.

Nokia, et al., "Random access principles for New Radio," 3GPP TSG-RAN WG1 Meeting #86, Gothenburg, Sweden, Aug. 22-26, 2016, R1-167296, 4 pages.

NTT Docomo, Inc., "Design for RACH Procedure for NR," 3GPP TSG RAN WG1 Meeting #86, R1-167378, Goteborg, Sweden, Aug. 22-26, 2016, 4 pages.

European Search Report for corresponding application EP17852233; dated Jul. 11, 2019.

International Search Report for corresponding application PCT/CN2017/094707 filed Jul. 7, 2017; dated Oct. 25, 2017.

Mediatek Inc, "Random Access Procedure for NB-IOT" 3GPP Draft, vol. RAN WG2, no. Malmo, Sweden Oct. 5, 2015-20150009, Oct. 4, 2015, URL: http://www.3gpp.org/ftp/meetings_3GPP_SYNC/RAN2/Docs.

* cited by examiner

RANDOM ACCESS METHOD, DEVICE, AND EQUIPMENT

CROSS-REFERENCE TO RELATED APPLICATION

This application is based upon and claims priority to PCT Application No. PCT/CN2017/094707 filed Jul. 27, 2017, which is based upon and claims priority to Chinese Patent Application No. 201610848341.3, filed Sep. 23, 2016, the entire contents of which are incorporated herein by reference.

TECHNICAL FIELD

The present disclosure relates to, but not limited to, wireless communication technologies, and particularly, to a random access method, device and equipment.

BACKGROUND

The new generation of mobile communication systems will be systematically networked on carrier frequencies higher than those used in 2G, 3G, and 4G systems. Currently, the industry has widely recognized and internationally recognized frequency bands are mainly 3 GHz to 6 GHz, 6 GHz to 100 GHz. As compared with the networking frequency of early communication systems, these bands are relatively high, the loss is greater in propagation, and similarly the coverage radius is relatively small under the same power. This determines the small cell will be the main form in the networks of the new generation mobile communication systems. In addition, many of these frequency bands belong to unlicensed spectrum, and the RF signal rules of the unlicensed spectrum need to be followed. For example, the rules of the post-listening are to be followed, and a transport point needs to monitor the channel and can transmit signals until the channel is idle.

In the small cell, in the traditional four-step method of the LTE random access procedure, the random access and contention resolution functions need to be finished in four complete steps before the RRC (Radio Resource Control) link can be established. The four steps are as follows. In Step 1: a terminal (UE) sends a preamble. In Step 2: an evolved base station (eNodeB) sends a Random Access Response. In Step 3: the UE sends a message III (Msg3). In Step 4: the eNodeB sends contention resolution.

For the unlicensed spectrum, because the four steps of LTE random access need to wait for the idle signal to transmit signals before each transmission, the traditional four-step random access process needs to listen and wait for the idle channel to transmit signals. If the channel occupation ratio is high, the random access process will be too long.

SUMMARY

The following is an overview of the topics detailed in this document. This summary is not intended to limit the scope of the claims.

The present disclosure discloses a random access method, device and equipment that can reduce random access delay.

An embodiment of the present disclosure discloses a random access method, including:

receiving, by a network node, a random access request, wherein the random access request includes a preamble and a first data block; and sending, by the network node, a random access response.

An embodiment of the present disclosure discloses a random access method, including:

sending, by a terminal, a random access request, wherein the random access request includes a preamble and a first data block; and demodulating, by the terminal, a received random access response.

An embodiment of the present disclosure discloses a random access device, including:

a first receiving module configured to receive a random access request, wherein the random access request includes a preamble and a first data block; and a first sending module configured to send a random access response.

An embodiment of the present disclosure discloses a network node which includes the random access device as described above.

An embodiment of the present disclosure discloses a random access device, including:

a second sending module configured to send a random access request, wherein the random access request includes a preamble and a first data block; and a second receiving module configured to demodulate a received random access response.

An embodiment of the present disclosure discloses a terminal which includes the random access device as described above.

An embodiment of the present disclosure discloses a computer readable storage medium having computer executable instructions stored therein, where when the computer executable instructions re executed by a processor, the processor is caused to implement the random access methods as described above.

In embodiments of the present disclosure, a network node receives a random access request, the random access request including a preamble and a first data block; and the network node transmits a random access response (RAR). In the embodiment of the present disclosure, the terminal attempts to access by using a simplified random access method at the beginning. If the transmission is correct in each step, the access can be completed in two steps, and the random access delay can be reduced.

Further, if the control information or data demodulation fails, the access process can be completed by performing retransmission or contention resolution, and the retransmission or contention resolution step can be seamlessly integrated with the related four-step method as a simplified basis, which is very advantageous for the unified design of the system, is beneficial to reduce the implementation complexity of the network side and the terminal. In terms of performance, the whole delay of random access is significantly reduced, and the amount of reduction in the actual delay depends on the probability that the transmitted content is correctly received by the network node. Also, compared with LTE, the access success rate is further improved in the case of same delay.

DETAILED DESCRIPTION

The embodiments of the present disclosure will be described in detail below with reference to the accompanying drawings.

The steps illustrated in the flowcharts may be executed in a computer system including a set of computer executable instructions. Although logical sequences are shown in the flowcharts, in some cases the steps shown or described may be performed in a different order than the ones described herein.

Figure 1:
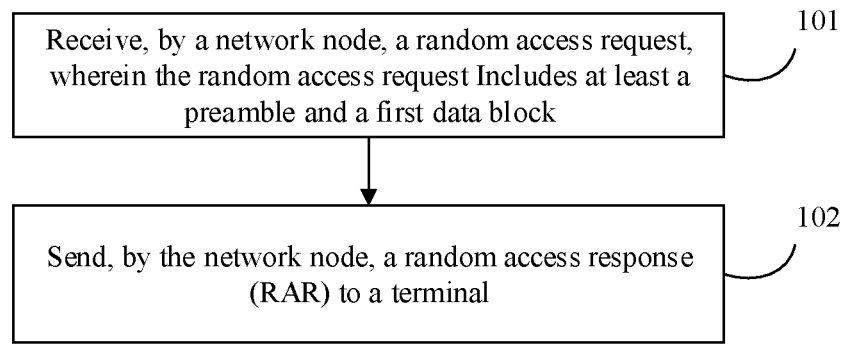
FIG. 1 is a schematic flowchart of a random access method according to an embodiment of the present disclosure.

An embodiment of the present disclosure provides a random access method, as shown in FIG. 1. The method includes the following steps:

In step 101, a network node receives a random access request, where the random access request includes at least a preamble and a first data block.

In step 102, the network node sends a random access response (RAR) to a terminal.

In an embodiment, after step 102, the method further includes:

Step 103: the network node receives a second data block transmitted by the terminal or receives the random access request again.

In embodiments of the present disclosure, the network node may be a base station or another transport point (TRP) or the like.

Here, the network node receives the second data block transmitted by the terminal, and the second data block may be any one of the following information:

information which is the same as the first data block;

information (34 bits) in original information (for example 100 bits) other than the first data block (66 bits), or information including information (34 bits) in the original information (100 bits) other than the first data block and information in a portion of the first data block (a part of the 66 bits); or information that is completely different from the original information;

wherein the original information is: control information pre-transmitted by a terminal to the network node, or the control information and data information.

The first data block or the second data block includes control information, or includes the control information and data information;

the control information includes at least terminal identification (UE ID).

The RAR includes at least preamble identification (ID) in the random access request.

In an embodiment, if the network node successfully demodulates the first data block, the RAR includes:

a preamble ID in the random access request and a UE ID in the control information; or a preamble ID in the random access request, a UE ID in the control information and uplink grant information (UL grant) for allocating uplink resources.

In an embodiment, if the network node does not successfully demodulates the first data block, the RAR includes:

a preamble ID in the random access request; or uplink grant information (UL grant) for allocating uplink resources and a preamble ID in the random access request. In and embodiment, if the network node does not successfully demodulates the first data block, the RAR includes signaling for transmitting the second data block or retransmitting the random access request.

In an embodiment of the present disclosure, receiving, by the network node, a second data block transmitted by a terminal, or re-receiving, by the network node, the random access request, includes:

receiving, by the network node, the second data block transmitted by the terminal, or re-receiving, by the network node, the random access request in an uplink resource allocated by the uplink grant information.

In an embodiment of the present disclosure, wherein receiving, by the network node, a second data block transmitted by a terminal, or re-receiving, by the network node, the random access request, includes:

receiving, by the network node, the second data block, or re-receiving, by the network node, the random access request in a preset random access request resource.

In an embodiment of the present disclosure, a resource allocated by the UL grant in the RAR includes a plurality of orthogonal resources used for a plurality of terminals.

Here, the preamble ID is included in the RAR in an explicit or implicit manner.

The implicit manner refers to that the network node determines a scrambling sequence based on the preamble ID.

The UE ID is included in the RAR in an explicit or implicit manner. The implicit manner refers to that the network node determines a scrambling sequence based on the UE ID.

In an embodiment of the present disclosure, after the network node receives the second data block or re-receives the random access request, the method further includes:

notifying, by the network node, a terminal of UE ID.

In embodiments of the present disclosure, the terminal attempts to access by using a simplified random access method at the beginning. If the transmission is correct in each step, the access can be completed in two steps; if the demodulation of the control information or data fails, the access process can be completed by performing retransmission or contention resolution, and the added steps can be seamlessly integrated with the related four-step method as a simplified basis, which is very advantageous for the unified design of the system, and is beneficial to reduce the implementation complexity of the network side and the terminal.

In terms of performance, the whole delay of random access is significantly reduced, and the amount of reduction in the actual delay depends on the probability that the transmitted content is correctly received by the network node. Also, compared with LTE, the access success rate is further improved in the case of same delay.

Figure 2:
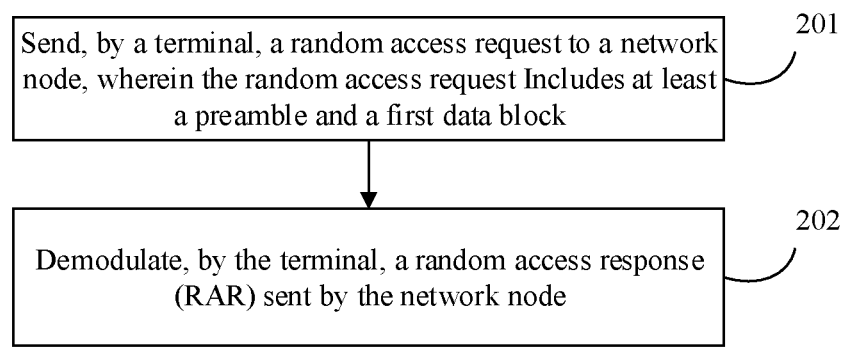
FIG. 2 is a schematic flowchart of a random access method according to an embodiment of the present disclosure.

An embodiment of the present disclosure further provides a random access method, as shown in FIG. 2. The method includes the following steps.

In step 201, a terminal sends a random access request to a network node. The random access request includes at least a preamble and a first data block.

In step 202, the terminal demodulates a random access response RAR which is sent from the network node.

In an embodiment, after step 202, the method further includes:

In step 203, the terminal transmits a second data block or re-transmits the random access request according to the RAR.

The second data block transmitted by the terminal is any one of the following information:

information which is the same as the first data block;

information (24 bits) in original information (100 bits) other than the first data block (66 bits), or information including information (24 bits) in the original information (100 bits) other than the first data block and information in a portion of the first data block (i.e., a part of the 66 bits); or information that is completely different from the original information;

wherein the original information is: control information pre-transmitted by the terminal to the network node, or the control information and data information.

In an embodiment, the first data block or the second data block includes control information or includes the control information and data information; and the control information includes at least UE ID.

In an embodiment, the RAR includes at least the preamble ID in the random access request.

In an embodiment, the RAR includes:

the preamble ID in the random access request and the UE ID in the control information; or the preamble ID in the random access request, the UE ID in the control information and UL grant for allocating an uplink resource.

In an embodiment, the RAR includes:

the preamble ID in the random access request; or the UL grant for allocating an uplink resource and the preamble ID in the random access request.

In an embodiment, the RAR includes signaling for transmitting the second data block or retransmitting the random access request.

In an embodiment, transmitting, by the terminal, a second data block or re-transmitting, by the terminal, the random access request according to the random access response, includes:

if the terminal receives the preamble ID included in the random access response but control information in the random access request is not received, or if the terminal receives re-transmission signaling, transmitting, by the terminal, the second data block, or re-transmitting, by the terminal, the random access request using an uplink resource allocated by the UL grant included in the RAR.

In an embodiment, transmitting, by the terminal, a second data block or re-transmitting, by the terminal, the random access request according to the random access response, includes:

if the terminal receives the preamble ID included in the random access response but control information in the random access request is not received, or if the terminal receives re-transmission signaling, transmitting, by the terminal, the second data block, or re-transmitting, by the terminal, the random access request using a preset random access request resource.

In an embodiment, transmitting, by the terminal, a second data block or re-transmitting, by the terminal, the random access request according to the random access response, includes:

selecting, by the terminal, different resources in the resource allocated by the uplink grant information to perform transmissions according to the UE ID in the control information.

In an embodiment, selecting, by the terminal, different resources in the resource allocated by the uplink grant information according to the terminal identification in the control information, includes:

selecting, by the terminal, one of M uplink resources notified by the uplink grant information by UE ID Mod M (i.e., by taking the remainder when dividing the terminal identification by M), where M is 1, 2, 4, 8 or 16.

In the above technical solution, transmitting, by the terminal, a second data block or re-transmitting the random access request according to the random access response, includes:

selecting, by the terminal, different resources in the preset random access request resource according to the UE ID in the control information.

In the above technical solution, the preamble ID is included in the RAR in an explicit or implicit manner.

The implicit manner refers to that a scrambling sequence is determined based on the preamble ID.

The UE ID in the control information is included in the RAR in an explicit or implicit manner. The implicit manner refers to that a scrambling sequence is determined based on the UE ID.

In an embodiment, after the terminal transmits the second data block or re-transmits the random access request, the method further includes:

receiving UE ID notified by the network node.

In an embodiment, demodulating, by the terminal, the received RAR, includes:

if the terminal receives the preamble ID included in the RAR, receives the UE ID in the control information in the random access request and confirms that the received preamble ID and the UE ID are completely consistent with the preamble identification and the terminal identification in the random access request, ending the random access procedure.

In embodiments of the present disclosure, the terminal attempts to access by using a simplified random access method at the beginning. If the transmission is correct in each step, the access can be completed in two steps; if the demodulation of the control information or data fails, the access process can be completed by performing retransmission or contention resolution, and the added steps can be seamlessly integrated with the related four-step method as a simplified basis, which is very advantageous for the unified design of the system, and is beneficial to reduce the implementation complexity of the network side and the terminal. In terms of performance, the whole delay of random access is significantly reduced, and the amount of reduction in the actual delay depends on the probability that the transmitted content is correctly received by the network node. Also, compared with LTE, the access success rate is further improved in the case of same delay.

Figure 3:
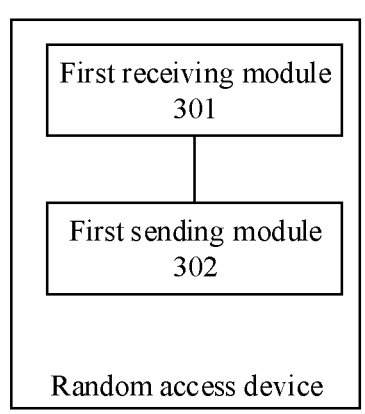
FIG. 3 is schematic block diagram of a random access device according to an embodiment of the present disclosure.

An embodiment also provides a random access device for realizing the above methods, as shown in FIG. 3. The device includes a first receiving module 301 and a first sending module 302.

The first receiving module 301 is configured to receive a random access request, wherein the random access request includes at least a preamble and a first data block.

The first sending module 302 is configured to send a random access response RAR to a terminal.

In an embodiment, the first receiving module 301 is further configured to receive a second data block or re-receive the random access request.

Here, the network node receives the second data block transmitted by the terminal, and the second data block may be any one of the following information:

information which is the same as the first data block;

information (34 bits) in original information (for example 100 bits) other than the first data block (66 bits), or information including information (34 bits) in the original information (100 bits) other than the first data block and information in a portion of the first data block (a part of the 66 bits); or information that is completely different from the original information;

wherein the original information is: control information pre-transmitted by a terminal to the network node, or the control information and data information.

The first data block or the second data block includes control information, or includes the control information and data information;

the control information includes at least UE ID.

The RAR includes at least ID in the random access request.

In an embodiment, the RAR includes:

a preamble ID in the random access request and a UE ID in the control information; or a preamble ID in the random access request, a UE ID in the control information and uplink grant information (UL grant) for allocating uplink resources.

In an embodiment, the RAR includes:

a preamble ID in the random access request; or uplink grant information (UL grant) for allocating uplink resources and a preamble ID in the random access request. In and embodiment, the RAR includes signaling for transmitting the second data block or retransmitting the random access request.

In an embodiment of the present disclosure, receiving, by the first receiving module 301, a second data block transmitted by a terminal, or re-receiving, by the network node, the random access request, includes:

receiving the second data block transmitted by the terminal, or re-receiving the random access request in an uplink resource allocated by the UL grant.

In an embodiment of the present disclosure, receiving, by the first receiving module 301, a second data block transmitted by a terminal, or re-receiving, by the network node, the random access request, includes:

receiving the second data block, or re-receiving the random access request in a preset random access request resource.

In an embodiment of the present disclosure, a resource allocated by the UL grant in the RAR includes a plurality of orthogonal resources used for a plurality of terminals.

Here, the preamble ID is included in the RAR in an explicit or implicit manner.

The implicit manner refers to that the first sending module 302 determines a scrambling sequence based on the preamble ID.

The UE ID is included in the RAR in an explicit or implicit manner. The implicit manner refers to that the first sending module 302 determines a scrambling sequence based on the UE ID.

Figure 4:
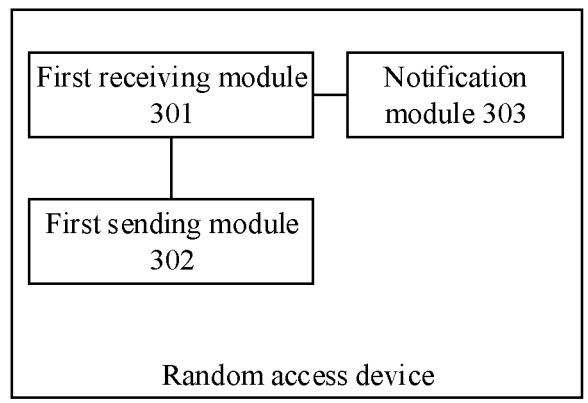
FIG. 4 is a schematic block diagram of a random access device according to an embodiment of the present disclosure.

In an embodiment of the present disclosure, as shown in FIG. 4, the device further includes:

a notification module 303 configured to, after the first receiving module 301 receives the second data block or re-receives the random access request, notifying the terminal of the UE ID in an explicit or implicit manner.

Figure 5:
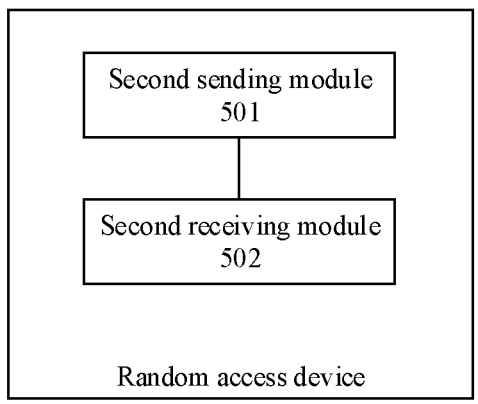
FIG. 5 is a schematic block diagram of a random access device according to an embodiment of the present disclosure.

An embodiment of the present disclosure also provides a random access device, as shown in FIG. 5. The device includes a second sending module 501 and a second receiving module 502.

The second sending module 501 is configured to send a random access request to a network node. The random access request includes at least a preamble and a first data block.

The second receiving module 502 is configured to demodulate a random access response RAR which is sent from the network node.

In an embodiment, the second sending module 501 is further configured to transmit a second data block or re-transmits the random access request according to the RAR.

The second data block transmitted by the terminal is any one of the following information:

information which is the same as the first data block;

information (24 bits) in original information (100 bits) other than the first data block (66 bits), or information including information (24 bits) in the original information (100 bits) other than the first data block and information in a portion of the first data block (i.e., a part of the 66 bits); or information that is completely different from the original information.

In an embodiment, the first data block or the second data block includes control information or includes the control information and data information; and the control information includes at least UE ID.

In an embodiment, the RAR includes at least the preamble ID in the random access request.

In an embodiment, the RAR includes:

the preamble ID in the random access request and the UE ID in the control information; or the preamble ID in the random access request, the UE ID in the control information and UL grant for allocating an uplink resource.

In an embodiment, the RAR includes:

the preamble ID in the random access request; or the UL grant for allocating an uplink resource and the preamble ID in the random access request. In an embodiment, the RAR includes signaling for transmitting the second data block or retransmitting the random access request.

In an embodiment, transmitting, by the second sending module 501, a second data block or re-transmitting, by the second sending module 501, the random access request according to the random access response, includes:

if the preamble ID included in the random access response is received but control information in the random access request is not received, or if re-transmission signaling is received, transmitting the second data block, or re-transmitting the random access request using an uplink resource allocated by the UL grant included in the RAR.

In an embodiment, transmitting, by the second sending module 501, a second data block or re-transmitting, by the second sending module 501, the random access request according to the RAR, includes:

if the preamble ID included in the RAR is received but control information in the random access request is not received, or if re-transmission signaling is received, transmitting the second data block, or re-transmitting the random access request using a preset random access request resource.

In an embodiment, transmitting, by the second sending module 501, a second data block or re-transmitting, by the second sending module 501, the random access request according to the random access response, includes:

selecting different resources in the resource allocated by the uplink grant information to perform transmissions according to the UE ID in the control information.

In an embodiment, selecting, by the terminal, different resources in the resource allocated by the uplink grant information according to the terminal identification in the control information, includes:

selecting, by the second sending module 501, one of M uplink resources notified by the uplink grant information by UE ID Mod M, where M is 1, 2, 4, 8 or 16.

In the above technical solution, transmitting, by the second sending module 501, a second data block or re-transmitting the random access request according to the random access response, includes:

selecting different resources in the preset random access request resource according to the UE ID in the control information.

In the above technical solution, the preamble ID is included in the RAR in an explicit or implicit manner.

The implicit manner refers to that a scrambling sequence is determined based on the preamble ID.

The UE ID in the control information is included in the RAR in an explicit or implicit manner. The implicit manner refers to that a scrambling sequence is determined based on the UE ID.

In an embodiment, after the second sending module 501 transmits the second data block or re-transmits the random access request, the second receiving module 502 receives UE ID notified by the network node in an explicit or implicit manner.

In an embodiment, demodulating, by the second receiving module 502, the RAR sent by the network node, includes:

if the preamble ID included in the RAR is received, the UE ID in the control information in the random access request is received and it is confirmed that the received preamble ID and the UE ID are completely consistent with the preamble identification and the terminal identification in the random access request, ending the random access procedure.

In practical applications, each unit in the data processing apparatus in the embodiments of the present disclosure may be implemented by a processor in a network element where the data processing apparatus is located, or may be implemented by a specific logic circuit; for example, in an actual application, each unit may be implemented by a central processing unit (CPU), a microprocessor (MPU), a digital signal processor (DSP), or a field programmable gate array (FPGA) located in the data processing apparatus.

An embodiment of the present disclosure further provides a network node, which may be a base station or other transport point. The network node includes: the random access device described in FIG. 3 and FIG. 4.

An embodiment of the present disclosure further provides a terminal, which may include: the random access device described in FIG. 5.

It should be noted here that detailed description regarding the above device embodiments can be found in the description regarding the above method embodiments, the device embodiments have the same beneficial effects as the method embodiments, and therefore repeated descriptions will be omitted. For the details of the technical solutions that are not disclosed in the device embodiments of the present disclosure, those skilled in the art can refer to the description of the foregoing method embodiments and the following specific application examples of the present disclosure, and repeated descriptions will be omitted.

The present disclosure will be described in detail below with reference to specific application embodiments. In the following embodiments, the network node is a base station or a transport point, for example.

Embodiment 1

Simplified Method of Random Access Process

At present, since the cell coverage radius becomes small, the step for the terminal to obtain the TA (time advanced) by transmitting the random access response is unnecessary, so further simplifying the steps becomes a possibility. For some terminals, such as IoT terminals, after establishing a link with the network through random access, there is not a large amount of data to be transmitted, and a very small amount of data information to be transmitted can also be considered to be merged into random access, and this further supports the need to simplify random access steps.

Therefore, in order to further reduce the access delay of random access in the next generation communication systems, the following processing can be performed based on the method in LTE.

Since the process of obtaining the TA by the terminal through the random access response is not necessary, that is, it is not necessary to send the uplink access information after adjusting the timing, the relevant steps of the random access can be adjusted to finally form a simplified random access procedure.

Figure 6:
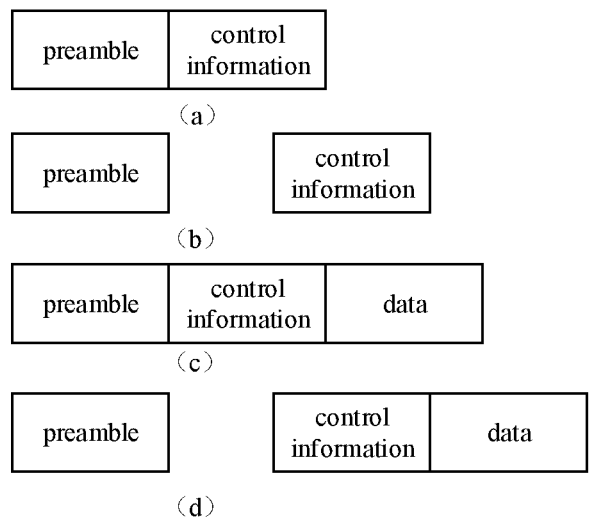
FIG. 6 is a structural diagram of a TDM multiplexing manner for transmitting content in step 1 of a new communication system according to first embodiment of the present disclosure.

In the new generation communication systems, the terminal sends the preamble and the control information in the Msg3 in the original LTE system, and smaller amount of data information may be added. As shown in FIG. 6, there are four possible time division multiplexing (TDM) modes. It is worth noting that the blocks do not necessarily need to be connected end to end in time, and a pre-configured time blank (or gap) can be left between the blocks, as shown in (c) and (d) of FIG. 6.

As shown in FIG. 6, the preamble and control information and the data part are multiplexed by means of TDM, and other multiplexing methods such as frequency division multiplexing or code division multiplexing may also be used. The preamble can be used as a reference signal to assist in demodulating control information or data parts.

Since the preamble is a code sequence, different codewords represent different preamble IDs, so the preamble implicitly contains the preamble ID. The control information includes a unique identification UE ID for each UE. This UE ID will be used for contention resolution. The UE ID is differentiated depending on the terminal status and the application scenarios. For the UE in the RRC_CONNECTED (Radio Resource Control_CONNECTED) state, the unique identifier is the cell radio network temporary identifier (C-RNTI). For a non-RRC_CONNECTED UE, a unique UE ID (S-TMSI, Serving-Temporary Mobile Subscriber Identity or a random number) from the core network will be used as its UE ID. In addition to this, the UE ID in the new generation communication system does not exclude other terms that can be used to characterize the UE.

The UL Grant (UpLink Grant) and the contention resolution can be combined into one step, that is, the base station or the transport node (TRP) sends through RAR the preamble ID, the control information (such as the UE ID) and UL Grant received from the random access request. The control information (such as the UE ID) or the preamble ID may be sent explicitly or implicitly. The implicit notification for a terminal is indicated, for example, by scrambling the downlink control channel with the UE ID or the preamble ID. The preamble ID is used to confirm whether the preamble is successfully detected. The control information (such as the UE ID) can be used to resolve the multi-user contention, and the UL Grant is used to allocate the transmission resources of the uplink data after the access.

Figure 7:
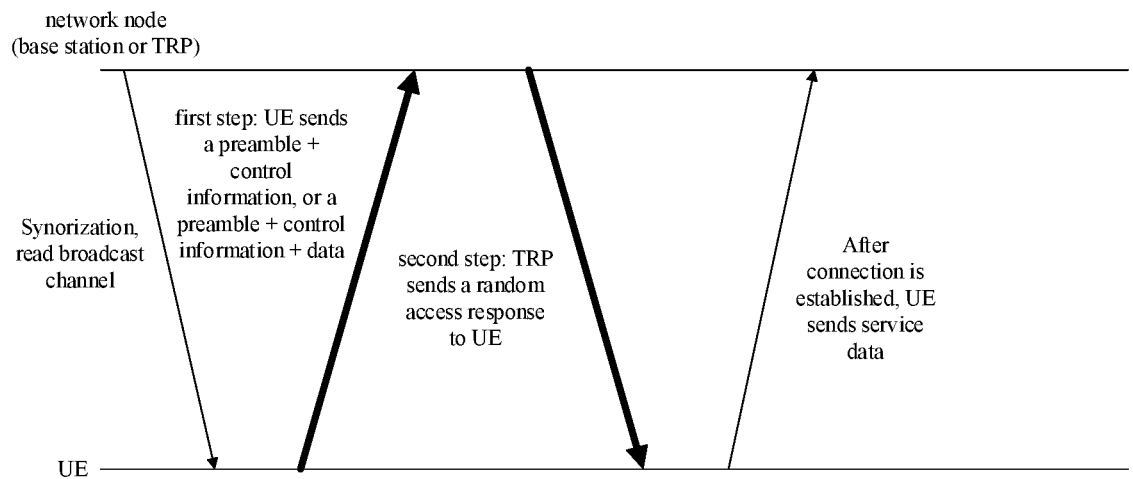
FIG. 7 is a schematic flowchart of a two-step random access method according to the first embodiment of the present disclosure.

FIG. 7 shows a random access procedure in a new generation communication systems. As shown in FIG. 7, the terminal UE acquires downlink synchronization from a network node and reads a broadcast channel before initial uplink access, to obtain a resource position for random access request transmission. The terminal UE transmits a preamble and control information or a preamble, control information and data information to the network node. After receiving the preamble and the control information, or the preamble, the control information and data information correctly, the network node sends a random access response to the terminal. After the terminal correctly receives the random access response, the random access process ends, and terminal may subsequently select to send the uplink service data according to the data buffering situation.

Embodiment 2

First Scheme for Random Access Control Information and Data Information Retransmission This embodiment is applied when a partial transmission error occurs in the Embodiment 1. Generally, when the control information and the data information sent by the UE are together, they can be uniformly packaged into a data block to be transmitted. For the preamble, the detection rate and the false detection rate are mainly investigated, and for the data block formed by packaging the control information or the control information and the data information, the block error rate (BLER) or the bit error rate (BER) are mainly investigated. In general, in order to meet the demand for large coverage, the sequence of the preamble is long, and the required signal-to-interference ratio is relatively low. The control information or data block generally has at least ten to several tens of bits, and the signal-to-interference ratio required for demodulation is relatively high. In particular, in a random access, if multiple terminals select the same preamble, but the data blocks they carry are different, when a resource contention occurs, the data blocks are more susceptible to the interference of the contention. In the case of the same signal-to-interference ratio, it is easy for the preamble to be successfully detected by the base station or the transport point (TRP), but the base station or the transport point may not be able to correctly demodulate the control information, resulting in failure of the control information in the random access request, or resulting in failure of the control information and the data information in the random access request. This situation in which partial information is successfully received can be solved by the following scheme.

In the random access procedure, the terminal first sends a random access request to the base station or the transport point (TRP), and the random access request includes at least the preamble and the control information, and a part of the data may also be added in some scenarios. The control information includes at least the UR ID for contention resolution. The control information, the data information, or the control information plus the data information may be defined as the first data block.

The base station or the transport point (TRP) attempts to receive the random access request. When the base station or the transport point (TRP) successfully detects the preamble but does not successfully demodulate the control information or the data, the base station or the transport point (TRP) sends the random access response (RAR) to the terminal. The RAR includes at least the preamble ID for performing preamble confirmation with the terminal and a UL Grant for allocating resources for retransmitting the control information (including at least the UE ID) or retransmitting the data information, that is, allocating resources for the second data block. The second data block includes information that is the same as the information of the first data block, or information in the original information except the first data block, or information including information other than the first data block in the original information and a part of the information in the first data block, or includes information that is completely different from the information of the first data block. The second and third cases are illustrated as follows:

The information other than the first data block in the original information refers to, for example, other information (34 bits) of the original information (100 bits) except the first data block (66 bits).

The information including information other than the first data block in the original information and a part of the information of the first data block refers to: information including information (34 bits) other than the first data block (66 bits) in the original information (for example, 100 bits), and information in some of the first data blocks (a part of the 66 bits).

The UL Grant here is also significantly different from the UL Grant in the Embodiment 1. The UL Grant in the Embodiment 1 is a resource allocated for subsequent normal service data, and the UL Grant here is for allocating resources for retransmitting the control information or the data which is not successfully demodulated. The RAR may also contain some other contents, such as explicit signaling that is used for notifying the terminal to retransmit control information or data. Because the base station or the transport point does not successfully demodulate the control information or data, the RAR does not include the control information sent by the terminal, especially the UE ID sent by the terminal in the first step, and this is clearly different from the contents in the RAR which is sent in the idealized two-step random access procedure in Embodiment 1.

The RAR can also use explicit signaling to inform the terminal that the control information or data is not successfully demodulated and needs to be retransmitted. It is also possible to implicitly imply that the base station or the transport point (TRP) on the network side does not successfully demodulate the control information or data by not transmitting control information (UE ID).

The RAR may also include some other signaling according to the actual applications or scenarios, such as temporary C-RNTI for scrambling when retransmission is performed, TA (timing advance), and buffer status report (BSR) and the like.

The preamble ID included in the RAR may be explicitly notified in the RAR, or may be notified in an implicit manner by determining a scrambling sequence based on the preamble ID.

The UE ID included in the RAR may be explicitly notified in the RAR, or may be notified in an implicit manner by determining a scrambling sequence based on the UE ID.

Here, the scrambling sequence is determined based on the preamble ID and the UE ID. There are many methods for doing this, such as using the preamble ID or the UE ID to participate in scrambling the CRC of the control channel, or participating in scrambling the data of the channel itself. These methods do not exclude other parameters participating in determination and calculation of the scrambling sequence. The implicit notification methods in this embodiment can be similarly applied in other embodiments when implicit notification is needed.

According to the retransmission signaling, the terminal determines that the preamble is successfully transmitted but the control information or data needs to be retransmitted; or when the preamble ID is received and confirmed, and the control information is not received, the terminal determines that the preamble is successfully transmitted but the control information or data needs to be retransmitted. The terminal retransmits the control information or the data information in the first data block by using the resources provided by the UL Grant. The retransmitted data block is a second data block, which may be a retransmission of complete control information and data information in the first data block, the amount of information is the same; or, supplementary information of the control information and data in the first data block may be transmitted by using incremental redundancy techniques.

With reference to the Embodiment 1, the second data block may not have any direct relationship with the first data block, and may be a new data block. As described in the Embodiment 1, the first data block has been successfully transmitted, and new data block can be transmitted.

Until the retransmission is successfully demodulated by the base station or the transport point (TRP), the base station or the transport point (TRP) sends a successfully demodulated UE ID. The control information (such as UE ID) can be transmitted explicitly or implicitly. Notifying the terminal in an implicit manner refers to indicating the contention resolution by determining the scrambling sequence based on the UE ID, and ending the random access procedure.

The above steps are additional processes added when the control information or the data is not demodulated successfully. As explained below, if the multi-user conflict problem is resolved in advance by means of interference avoidance, it may not be necessary to implicitly or explicitly notify the UE ID.

When multiple terminals simultaneously select the same preamble to transmit information on the same resource, if no special avoidance design is made, the control information or data retransmitted by the terminals will still conflict and interfere with each other on the same resource. In this case, different resources among the resources allocated by the UL Grant may be separately selected according to the UE ID for interference avoidance. Assuming that at most M terminals will conflict on the same resource, different terminal transmissions can be allocated to M different parts of the uplink resources by using (UE ID) Mod M (i.e., by taking the remainder when (UE ID) is divided by M). Therefore, the interference problem of multi-user access is completely avoided in advance, and in this case, it may not be necessary to implicitly or explicitly transmit the UE ID. The method of distinguishing and multiplexing resources can be performed by means of time, frequency and orthogonal codes. The above is to distinguish the resources used by multiple users. If more resource overhead can be allowed, in the step of receiving the random access request, the resource of the random access request can be distinguished according to the UE ID to avoid interference.

Figure 8:
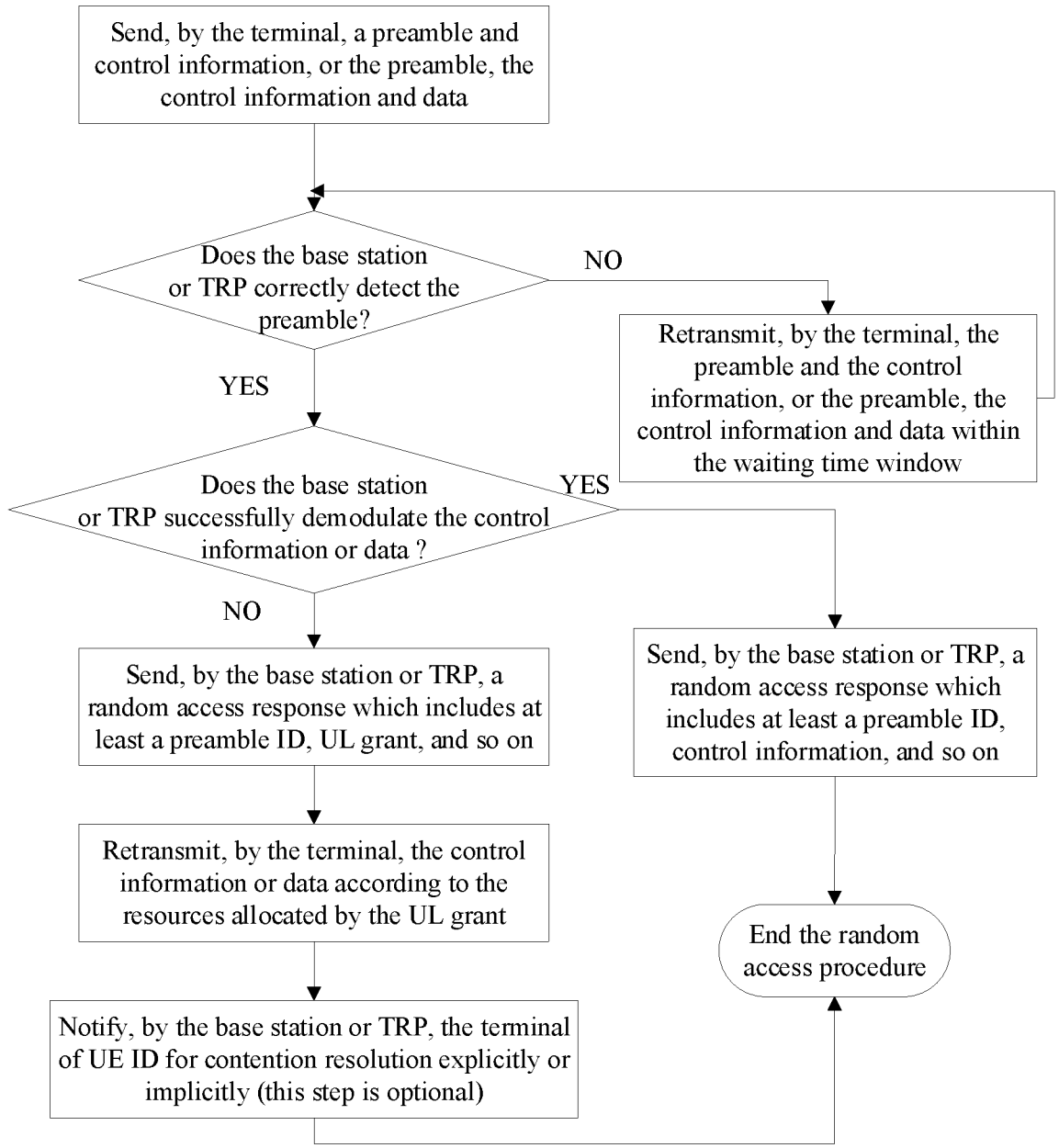
FIG. 8 is a flowchart of a random access method according to a second embodiment of the present disclosure.

From the perspective of the complete system level, the process can be described using FIG. 8.

From the perspective of terminal implementation, the process is like this:

The terminal sends a random access request to the base station or the transport point (TRP), and the random access request includes at least a preamble and control information, and a part of the data may be added in some scenarios. The control information includes at least the UE ID for contention resolution. Here, the control information, the data information, or control information+data information is defined as a first data block.

The terminal demodulates a random access response (RAR) sent by the base station or the transport point (TRP).

For the subsequent steps, there may be the following two possible branches.

First Branch:

When the RAR does not include the control information sent by the terminal, especially the UE ID sent by the terminal in the random access request, or the RAR has signaling for notifying the terminal to retransmit the control information or data, the terminal uses the resources for retransmission allocated by the UL grant in the RAR to retransmit the control information or data. The retransmitted contents are defined as the second data block. As stated previously, the second data block may include information that is the same as the first data block, or may include information is supplemental to the first data block. The precondition for this operation is that if the terminal determines that the preamble is received and the preamble ID is confirmed but the control information is not received, or signaling for transmitting the control information is received, the terminal may determine that the preamble is successfully transmitted but the control information or data needs to be retransmitted. Terminals may select different resources among the resources allocated by the UL grant according to their UE IDs to perform transmissions. For example, by the method of (UE ID) Mod M, different terminals are allocated to M different parts of the uplink resources notified by the UL Grant, thereby completely avoiding interference and solving the conflict problem of multi-user access in advance.

The terminal receives the UE ID that is implicitly or explicitly notified by the base station or the transport point (TRP). If the UE ID is the same as the UE ID in the first step, the conflict is resolved and the random access procedure is ended, and the next uplink service data transmission may be prepared. As explained above, if the multi-user conflict problem has been resolved in advance by means of interference avoidance, implicit or explicit notifying of the UE ID in this step may not be necessary.

Second Branch:

When the RAR includes the control information sent by the terminal, especially the UE ID sent by the terminal in the first step, if the terminal receives the preamble ID and confirms that the preamble ID and the UE ID are completely consistent with that in the random access request, the random access process ends. If the RAR further carries the UL Grant, the terminal can use the resources allocated by the UL Grant in the RAR to prepare for transmitting the service data. At this time, the transmitted second data block is not relevant to the first data block and is actually ne data. The premise of this operation is that the base station or the transport point correctly detects the preamble and demodulates the control information or data, and allows the terminal to confirm by sending back the RAR to the terminal. After the confirmation, there is no subsequent steps for retransmitting control information or data and notifying the UE ID by the base station or the transport point as described above.

From the perspective of base station or transport node implementation, the process is as follows:

The base station or the transport point (TRP) receives the random access request, and the random access request includes at least the preamble and the control information. In some scenarios, a part of the data may be added. The control information includes at least the UE ID used for the contention resolution.

For the subsequent steps, there may be the following two possible branches.

If the base station or the transport point (TRP) successfully detects the preamble but does not successfully demodulate the control information or data, the base station or the transport point (TRP) sends a random access response (RAR) to the terminal. The RAR includes at least: the preamble ID, which is used for the terminal to perform preamble confirmation (the preamble may be notified in an implicit or explicit manner, the implicit manner be realized by determining the scrambling sequence of the downlink control channel based on the preamble ID); and UL Grant for allocating resources for retransmitting the control information (including at least the UE ID) or retransmitting the data; or the RAR may include explicit signaling for notifying the terminal to retransmit the control information or data. However, the RAR does not include control information sent by the terminal, especially the UE ID sent by the terminal in the random access request. The base station or the transport point (TRP) may allocate multiple resources in a UL Grant to multiple terminals that may conflict with each other, for example, the notified uplink resources may be provided to M terminals for completely orthogonal transmissions. The retransmission may be the retransmission of the complete control information and the data information in the random access request, the information amount is the same; or, supplementary information of the control information and data in the random access request may be transmitted by using incremental redundancy techniques.

After receiving the retransmitted control information or data, the base station or the transport point explicitly or implicitly notifies the terminal of the UE ID for contention resolution. If the multi-user contention problem has been resolved in advance by means of interference avoidance, the step of notifying the UE ID may be omitted.

In the second branch, if the base station or the transport point (TRP) successfully detects the preamble and successfully demodulates the control information or data, the base station or the transport point (TRP) transmits another type of random access response (RAR) to the terminal. The RAR includes at least: a preamble ID for performing preamble confirmation with the terminal; the control information part including at least the UE ID for contention resolution, and possibly a UL Grant for allocating resources for subsequent normal service data. If the terminal does not need to transmit large amount of data in the initial access, the UL Grant may not be included in the RAR. The preamble ID or the UE ID in the control information may also be notified to the terminal in an implicit manner, for example, by using the preamble ID or the UE ID to scramble the downlink control channel. After the base station or the transport point finishes processing in this branch, the random access procedure ends. Next, in combination with the Embodiment 1, the base station or the transport point receives the second data block which is sent by the terminal and is totally new data and is not directly relevant to the first data block.

In embodiments of the present disclosure, the terminal attempts to access by using a simplified random access method at the beginning. If the transmission is correct in each step, the access can be completed in two steps; if the demodulation of the control information or data fails, the access process can be completed by performing retransmission or contention resolution, and the added steps can be seamlessly integrated with the related four-step method as a simplified basis, which is very advantageous for the unified design of the system, and is beneficial to reduce the implementation complexity of the network side and the terminal. In terms of performance, the whole delay of random access is significantly reduced, and the amount of reduction in the actual delay depends on the probability that the transmitted content is correctly received by the network node. Also, compared with LTE, the access success rate is further improved in the case of same delay.

Embodiment 3

Second Scheme for Random Access Control Information and Data Information Retransmission The terminal first sends a random access request to the base station or the transport point (TRP). The random access request includes at least a preamble and control information. In some scenarios, a part of the data may be added. The control information includes at least the UE ID for contention resolution. The base station or the transport point (TRP) attempts to receive the random access request. When the base station or the transport point (TRP) successfully detects the preamble but does not successfully demodulate the control information or data, the base station or the transport point (TRP) sends the random access response (RAR) to the terminal. The RAR includes at least a preamble ID for performing preamble confirmation with the terminal. The preamble ID may be notified by an implicit or explicit manner. Details regarding the implicit manner can be found in Embodiment 2. Since the base station or the transport point does not correctly demodulate the control information or data, the RAR does not include the control information sent by the terminal, and particularly the UE ID sent by the terminal in the random access request. It is also possible that the RAR includes signaling that explicitly notify the terminal to perform retransmission. When the terminal receives the retransmission signaling, or receives and confirms the preamble ID but does not receive the control information, the terminal determines that the preamble is successfully transmitted, but the control information or the data information needs to be retransmitted. The terminal retransmits the control information or the data information in the random access request by using the agreed resource location of the random access request. The terminal may further select different resources in the agreed resources for the random access request according to the UE ID in the control information sent by the random access request. The retransmitted control information or data information may be completely retransmitted information, or may be supplementary information, and details can be found in the description regarding Embodiment 2. Since the preamble is not retransmitted again, the available resources are increased, and the error correction code rate for retransmitting the control information or the data information may be lowered, or the power of the retransmission can be appropriately increased, so as to improve the demodulation success rate. Until the retransmission is successfully demodulated by the base station or the transport point (TRP), the base station or the transport node (TRP) explicitly or implicitly sends the successfully demodulated UE ID to resolve the contention and the random access procedure ends. The implicit method refers to that the UE ID is used to scramble the downlink control channel.

The main difference between this solution and the solution in the Embodiment 2 is that the allocation of uplink resources is not performed in the RAR, and the terminal utilizes resources of the random access request to perform retransmission of control information and data information. The basic advantages are similar to the Embodiment 2. As compared with the Embodiment 2, and the RAR overhead can be reduced, and the RAR reception success rate is further improved.

Embodiment 4

Third Scheme for Random Access Control Information and Data Information Retransmission The terminal first sends a random access request to the base station or the transport point (TRP), and the random access request includes at least the preamble and the control information, and a part of the data may also be added in some scenarios. The control information needs to include at least the UE ID for contention resolution.

The base station or the transport point (TRP) attempts to receive the random access request. When the base station or the transport point (TRP) successfully detects the preamble but does not successfully demodulate the control information or data, the base station or the transport point (TRP) sends the random access response (RAR) to the terminal. The RAR includes at least a preamble ID for performing preamble confirmation with the terminal. The preamble ID may be notified by an implicit or explicit manner. Details regarding the implicit manner can be found in Embodiment 2. The RAR further includes UL grant for allocating resources for retransmitting the control information (including at least the UE ID) or the data information. Since the base station or the transport point does not correctly demodulate the control information or data, the RAR does not include the control information sent by the terminal, and particularly the UE ID sent by the terminal in the random access request. It is also possible that the RAR includes signaling that explicitly notify the terminal to perform retransmission.

When the terminal receives the retransmission signaling, or receives and confirms the preamble ID but does not receive the control information, the terminal determines that the preamble is successfully transmitted, but the control information or the data information needs to be retransmitted. The terminal retransmits the control information or the data information in the random access request and the preamble notified in the RAR by using the resource location allocated by the UL Grant. The retransmitted control information or data information may be completely retransmitted information, or may be supplementary information, and details can be found in the description regarding Embodiment 2. The terminal selects different resources on the resources allocated by the UL Grant according to the UE ID to perform interference avoidance. Details can be found in description regarding Embodiment 2. By doing this, interference can be completely avoided and solve contention problem of multi-user access may be resolved in advance.

Until the retransmission is successfully demodulated by the base station or the transport point (TRP), the base station or the transport node (TRP) explicitly or implicitly sends the successfully demodulated UE ID to resolve the contention and the random access procedure ends. The implicit method refers to that the UE ID is used to scramble the downlink control channel.

The main difference between this solution and the solution in the Embodiment 2 is that the terminal not only retransmits the control information or the data information, but also retransmits the preamble as notified in the RAR. This scheme can be compatible with non-contention random access while keeping the advantages of the Embodiment 2, especially in the case of using different resources granted by the UL Grant for retransmission under the case of multi-user contention, thereby effectively avoiding access conflict.

Embodiments of the present disclosure also provide a computer readable storage medium storing computer executable instructions that, when executed by a processor, implement the random access methods described in FIG. 1.

Embodiments of the present disclosure also provide a computer readable storage medium storing computer executable instructions that, when executed by a processor, implement the random access method described in FIG. 2.

The embodiments disclosed in the present disclosure are as described above, but are merely used to facilitate the understanding of the present disclosure, and are not intended to limit the present disclosure. Any modification or variation in the form and details of the implementation may be made by those skilled in the art without departing from the spirit and scope of the disclosure. The scope is defined by the appended claims.

INDUSTRIAL APPLICABILITY

In embodiments of the present disclosure, the terminal attempts to access by using a simplified random access method at the beginning. If the transmission is correct in each step, the access can be completed in two steps; if the demodulation of the control information or data fails, the access process can be completed by performing retransmission or contention resolution, and the added steps can be seamlessly integrated with the related four-step method as a simplified basis, which is very advantageous for the unified design of the system, and is beneficial to reduce the implementation complexity of the network side and the terminal. In terms of performance, the whole delay of random access is significantly reduced. Also, compared with LTE, the access success rate is further improved in the case of same delay.

What is claimed is:

1. A wireless communication method for performing a random-access procedure, comprising:
   receiving, by a network node, a random access request from a terminal, wherein the random access request comprises a preamble and a first data block, and wherein the random access request comprises control information associated with the random-access procedure;
   transmitting, by the network node in response to the random access request, a random access response to the terminal, wherein the random access response that fails to include the same control information in the random access request signals a transmission of a second data block; and receiving, by the network node in response to the random access response, the second data block from the terminal, wherein the random access response comprises:

uplink grant information for allocating an uplink resource for the transmission of the second data block and a preamble identification corresponding to the preamble in the random access request.

2. The method according to claim 1, wherein the second data block comprises information that is the same as the first data block.

3. The method according to claim 1, wherein the first data block and the second data block comprise a terminal identification.

4. The method according to claim 1, wherein after the network node receives the second data block, the method further comprises:

notifying, by the network node, the terminal of a terminal identification.

5. A wireless communication method for performing a random-access procedure, comprising:

transmitting, by a terminal, a random access request to a network node, wherein the random access request comprises a preamble and a first data block, and wherein the random access request comprises control information associated with the random-access procedure;

receiving, by the terminal, a random access response from the network node in response to the random access request, wherein the random access response that fails to include the same control information in the random access request signals a transmission of a second data block; and transmitting, by the terminal in response to the random access response, the second data block to the network node, wherein the random access response comprises uplink grant information for allocating an uplink resource for the transmission of the second data block and a preamble identification corresponding to the preamble in the random access request.

6. The method according to claim 5, wherein the second data block comprises information that is the same as the first data block.

7. The method according to claim 5, wherein the first data block and the second data block comprise a terminal identification.

8. The method according to claim 5, comprising, after transmitting the second data block:

receiving, by the terminal, a terminal identification from the network node.

9. A wireless communication device, comprising a processor configured to:

receive a random access request from a terminal, wherein the random access request comprises a preamble and a first data block, and wherein the random access request comprises control information associated with a random-access procedure;

transmit, in response to the random access request, a random access response to the terminal, wherein the random access response that fails to include the same control information in the random access request signals a transmission of a second data block; and receive, in response to the random access response, the second data block from the terminal, wherein the random access response comprises uplink grant information for allocating an uplink resource for the second data block and a preamble identification corresponding to the preamble in the random access request.

10. The device of claim 9, wherein the second data block comprises information that is the same as the first data block.

11. The device of claim 9, wherein the first data block and the second data block comprise a terminal identification.

12. The device of claim 9, wherein the processor is configured to, after receiving the second data block, notify the terminal of a terminal identification.

13. A wireless communication device, comprising a processor configured to:

transmit a random access request to a network node, wherein the random access request comprises a preamble and a first data block, and wherein the random access request comprises control information associated with a random-access procedure;

receive, in response to the random access request, a random access response from the network node, wherein the random access response that fails to include the same control information in the random access request signals a transmission of a second data block; and transmit, in response to the random access response, the second data block to the network node, wherein the random access response comprises uplink grant information for allocating an uplink resource for the transmission of the second data block and a preamble identification corresponding to the preamble in the random access request.

14. The device of claim 13, wherein the second data block comprises information that is the same as the first data block.

15. The device of claim 13, wherein the first data block and the second data block comprises a terminal identification.

16. The device of claim 13, wherein the processor is configured to, after transmitting the second data block, receive a terminal identification from the network node.

* * * * *